Dec. 20, 1960
B. C. GARDNER ET AL
2,965,794
ELECTRON TUBE APPARATUS
Filed June 17, 1955
10 Sheets-Sheet 1
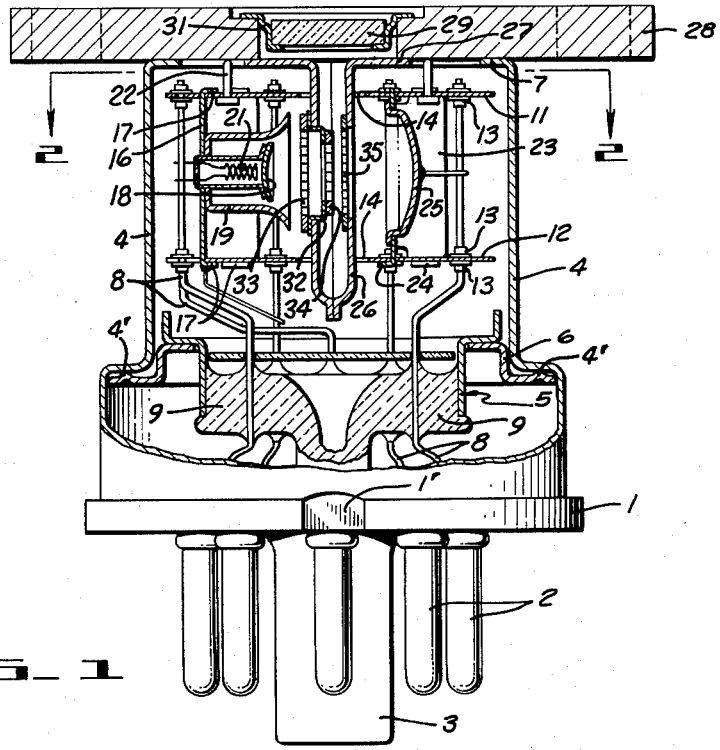
FIG_1
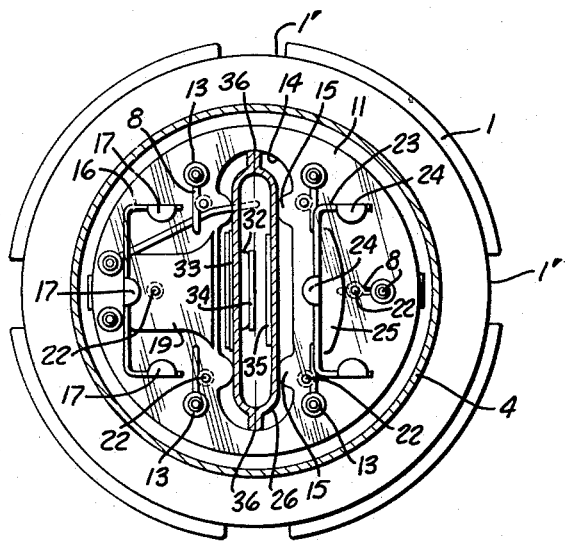
FIG_2
BERNARD C. GARDNER &
GEORGE F. REYLING
INVENTORS
BY Paul B. Hunter
ATTORNEY Dec. 20, 1960  B. C. GARDNER ET AL  2,965,794
ELECTRON TUBE APPARATUS
Filed June 17, 1955  10 Sheets-Sheet 2
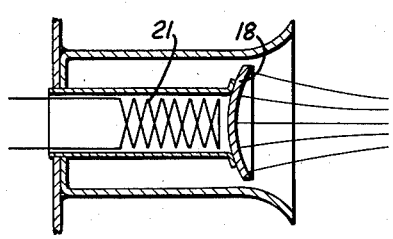
FIG_3A
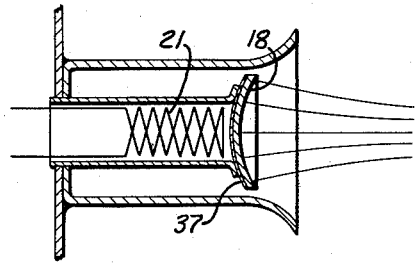
FIG_3B
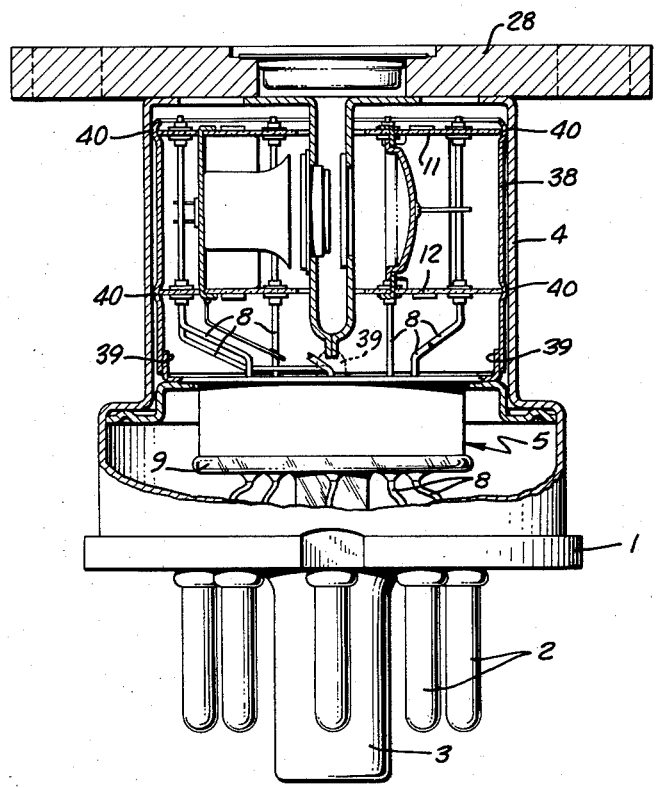
FIG_4
BERNARD C. GARDNER &
GEORGE F. REYLING
INVENTORS
BY Paul B. Hunter
ATTORNEY Dec. 20, 1960
B. C. GARDNER ET AL
2,965,794
ELECTRON TUBE APPARATUS
Filed June 17, 1955
10 Sheets-Sheet 3
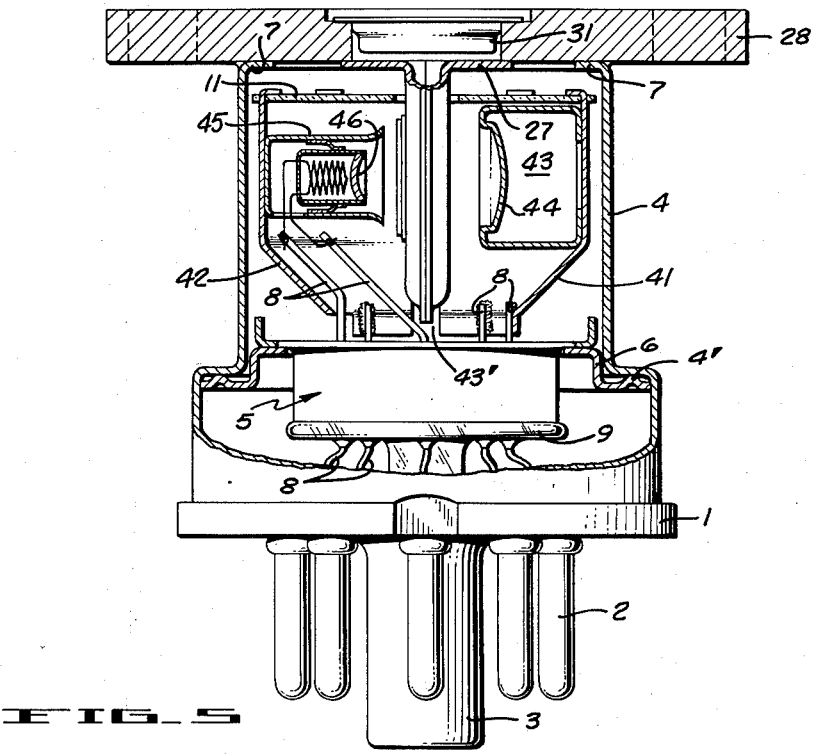
FIG_5
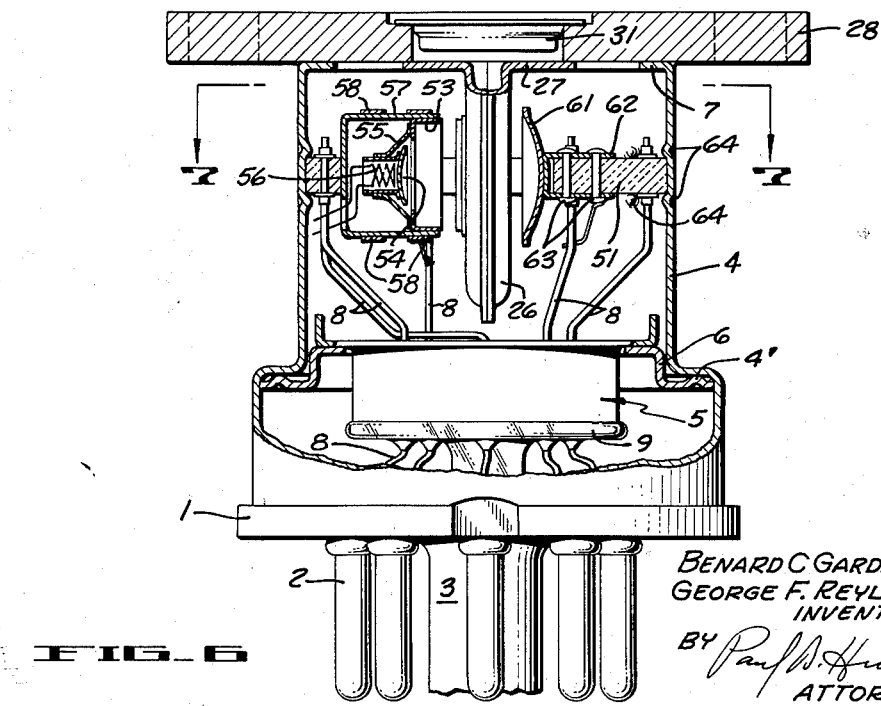
FIG_6
BENARD C. GARDNER &
GEORGE F. REYLING
INVENTORS
BY
ATTORNEY

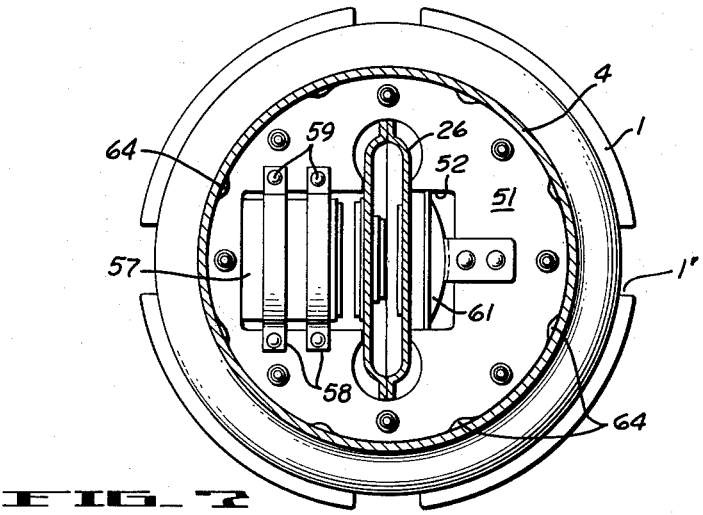
FIG_7
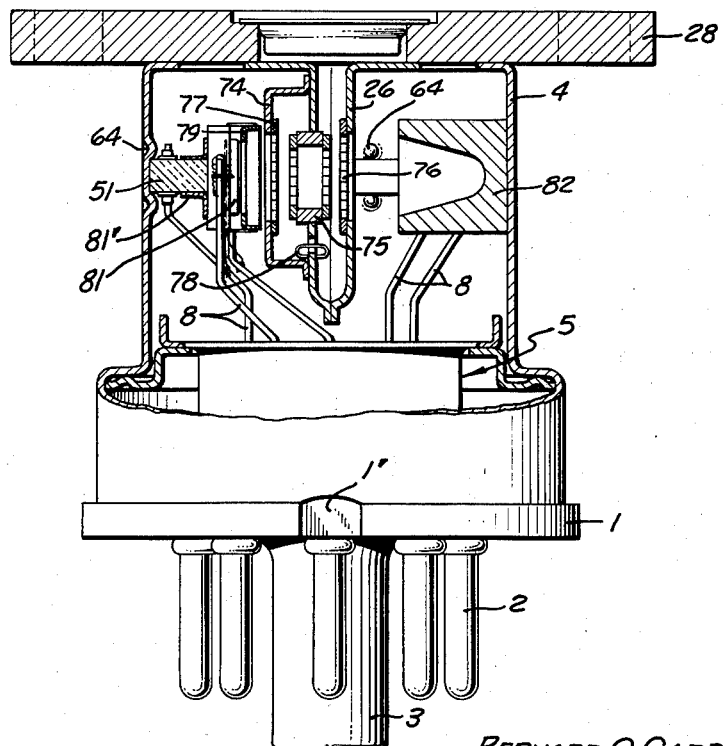
FIG_10
BERNARD C. GARDNER &
GEORGE F. REYLING
INVENTORS
BY *Paul B. Hunter*
ATTORNEY

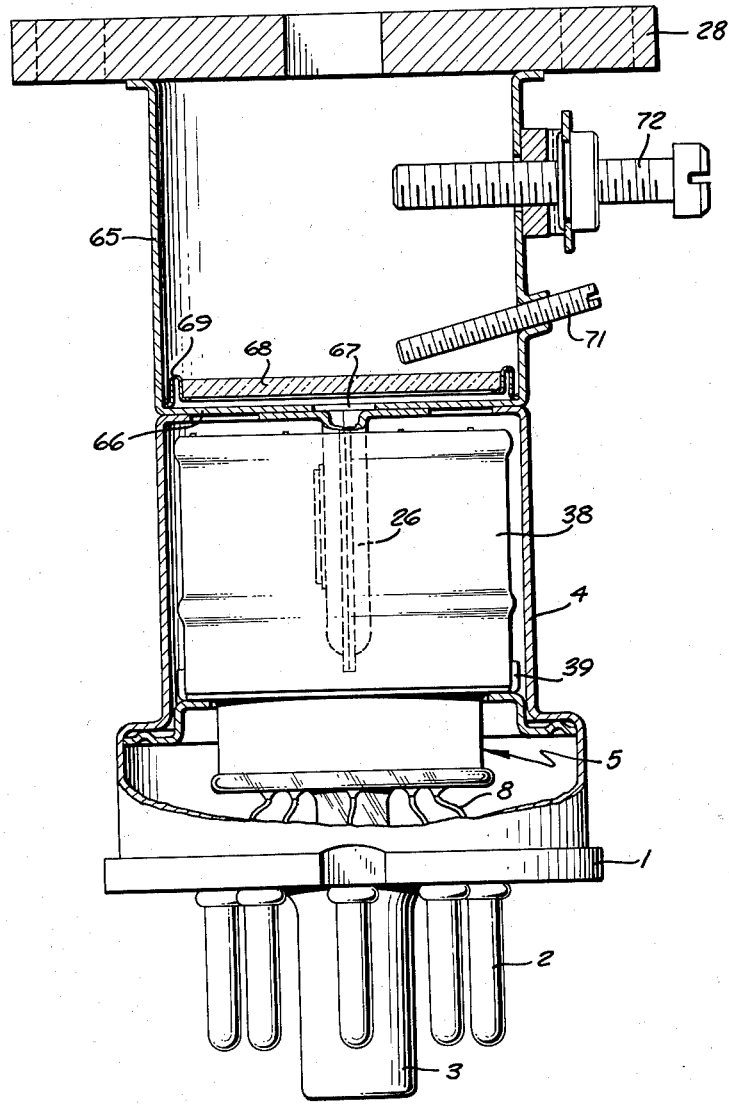

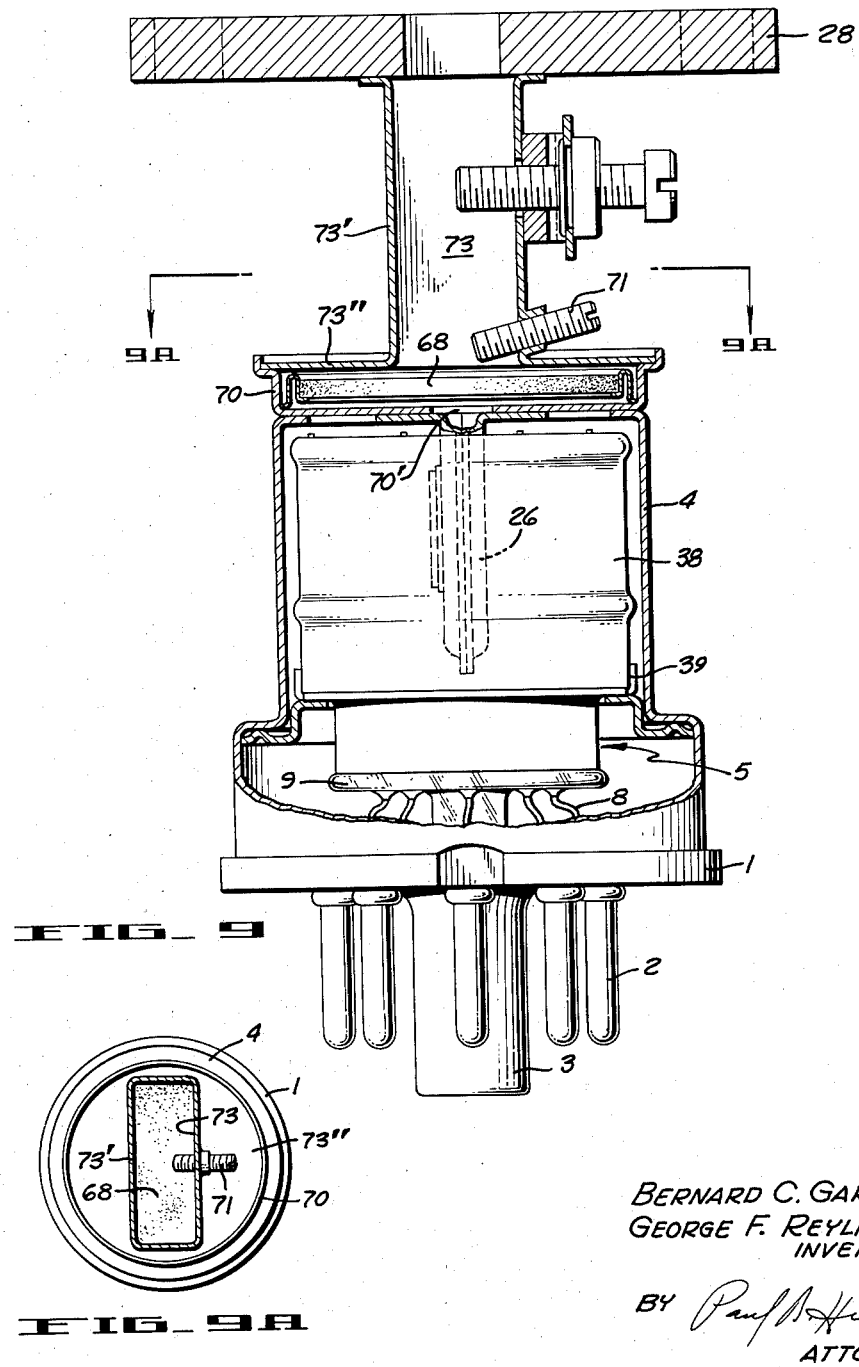

Dec. 20, 1960  B. C. GARDNER ET AL  2,965,794
ELECTRON TUBE APPARATUS
Filed June 17, 1955   10 Sheets-Sheet 7
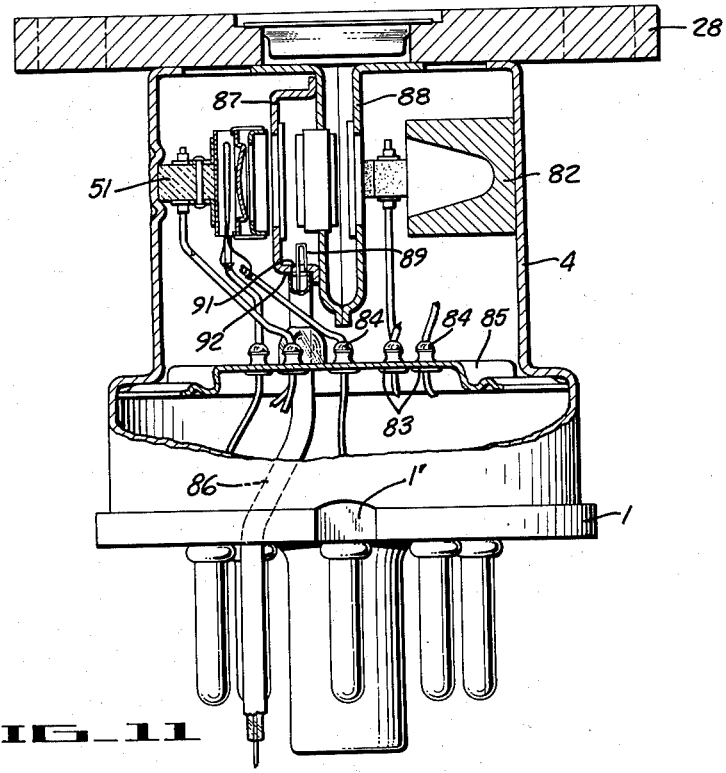
FIG_11
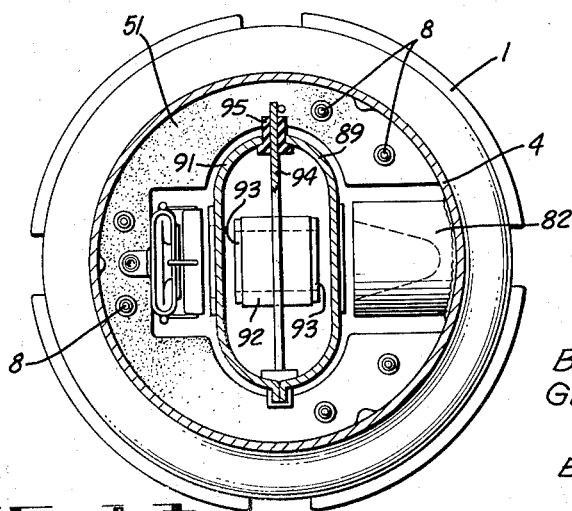
FIG_13
BERNARD C. GARDNER &
GEORGE F. REYLING
INVENTORS
BY
ATTORNEY

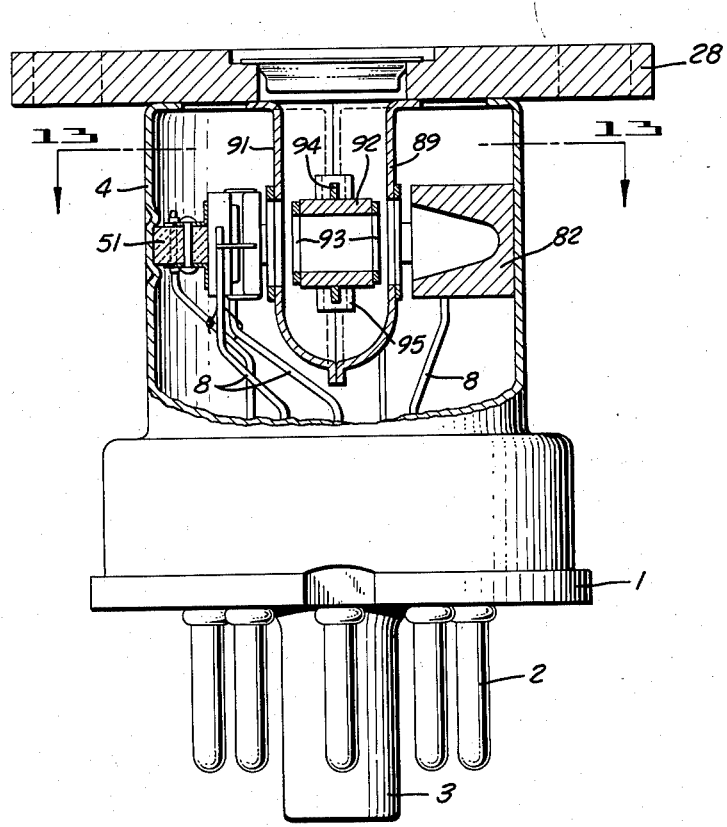

Dec. 20, 1960
B. C. GARDNER ET AL
2,965,794
ELECTRON TUBE APPARATUS
Filed June 17, 1955
10 Sheets-Sheet 9
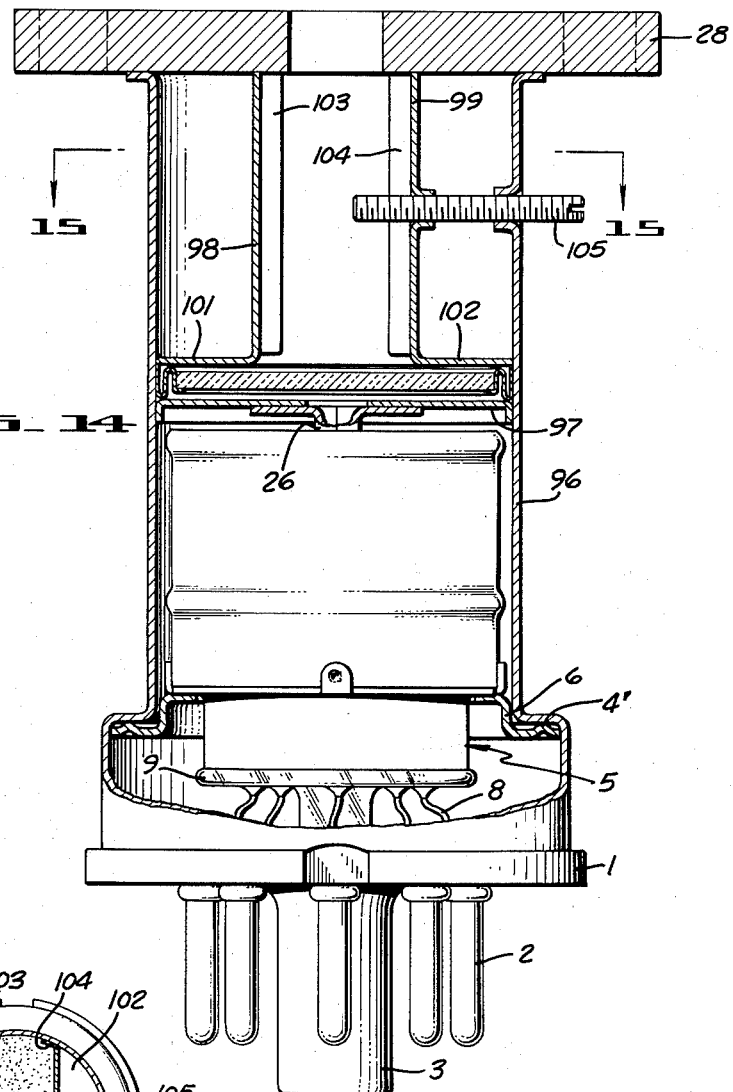
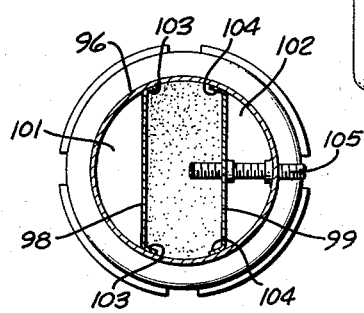
BERNARD C. GARDNER &
GEORGE F. REYLING
INVENTORS
BY Paul D. Hunter
ATTORNEY Dec. 20, 1960   B. C. GARDNER ET AL   2,965,794
ELECTRON TUBE APPARATUS
Filed June 17, 1955   10 Sheets-Sheet 10
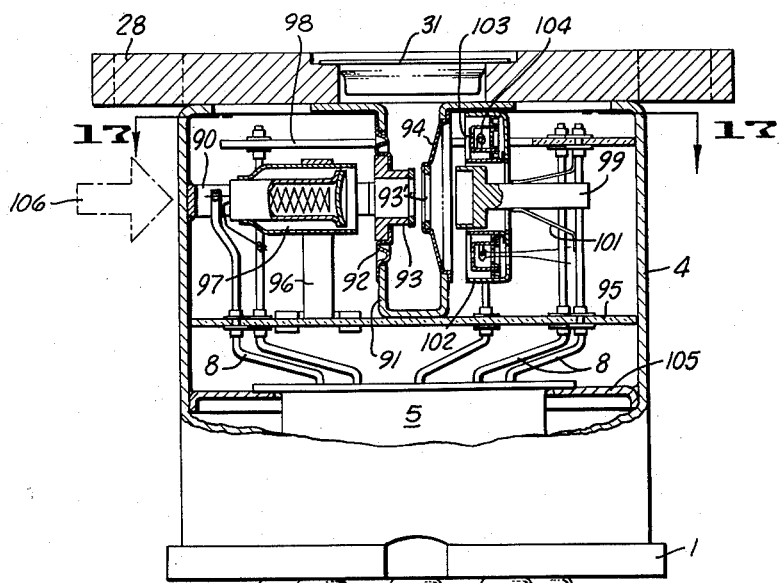
FIG_16
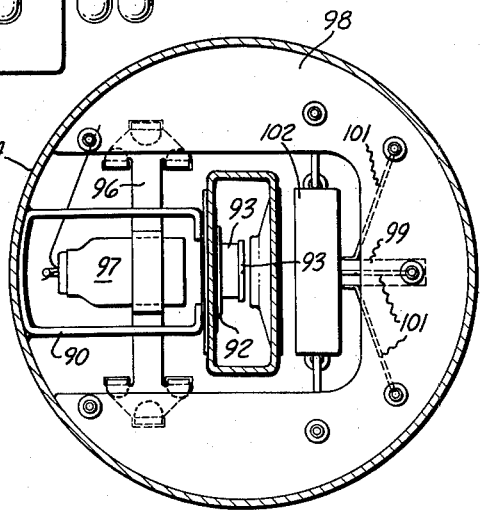
FIG_17
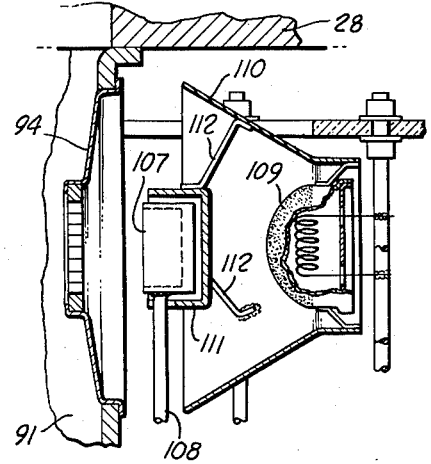
FIG_18
BERNARD C. GARDNER &
GEORGE F. REYLING
   INVENTORS
BY
   ATTORNEY

United States Patent Office 2,965,794
Patented Dec. 20, 1960

2,965,794

ELECTRON TUBE APPARATUS

Bernard C. Gardner, Los Altos, and George F. Reyling, Menlo Park, Calif., assignors to Varian Associates, San Carlos, Calif., a corporation of California Filed June 17, 1955, Ser. No. 516,096

12 Claims. (Cl. 315—5)

This invention relates in general to velocity modulation electron tubes and, more particularly, to a novel klystron tube and method of fabrication and assembly which results in a device that may be produced inexpensively in quantity.

Velocity modulation devices of the klystron type are utilized in very high frequency applications where the ordinary cathode-grid-plate types of electron tubes are unable to operate. While performing much the same functions as the ordinary vacuum tube at the much higher frequencies, although in quite a different manner, the klystron has been a great deal more expensive than its vacuum tube counterpart in the low frequency field. This increase in cost has been due in great part to the heretofore inability to produce a klystron structure and a method of assembling the structure which could be adapted to the mass production machinery, assembly parts and methods utilized in standard electronic tube manufacture.

There has also been present in heretofore existing klystrons a difficulty which has been termed F-M noise which appears on the electron beam of the klystron as a result of the modulation of the electron beam by stray magnetic fields produced by the electrical currents through the filament heater. These stray magnetic fields enter the electron emission region of the cathode and modulate the beam at the frequency of the electrical current, for example, 60 cycles, applied to the heater filament.

It is an object of the present invention to provide a novel klystron structure and method of assembly which is suitable for mass production of klystron tubes utilizing standard, inexpensive tube elements, the resultant device being substantially free from F-M noise.

One feature of the present invention is the provision of a klystron in which a standard, mass produced mounting member or stem having certain of the main elements of the klystron such as, for example, the cathode gun and focus ring, rigidly mounted thereon is vacuum sealed within one end of a mass produced metallic bulb such that the electron beam path through the device is transverse to the axis of the bulb and mounting member, the cavity resonator extending into the evacuated bulb from the other end thereof.

Another feature of the present invention is the provision of a klystron of the above type in which the cavity resonator is formed of stamped metal sheeting, the resonator having an opening in one side, the cavity resonator being mounted over the iris opening of an output waveguide flange which is vacuum sealed over said other end of the bulb.

Another feature of the present invention is the provision of a novel reflex klystron device in which the cathode assembly, including the cathode button and focus ring, and the reflector electrode are fixedly mounted on a common mounting member in alignment before their assembly into the vacuum-envelope body structure of the klystron.

Still another feature of the present invention is the provision of a novel klystron device having an external cavity coupled to the internal, evacuated cavity for tuning the klystron device, the two cavity resonators being formed from pressed metal.

Still another feature of the present invention is the provision of a klystron as set forth in the first feature above in which an external cavity formed of a second metal bulb is mounted over the said other end of the first bulb, there being means in the external cavity for tuning this klystron.

Another feature of the present invention is a klystron device made in accordance with the above first feature in which a floating drift tube type of klystron is produced.

Another feature of the present invention is a klystron device made in accordance with the above first feature in which a thermally tuned type of klystron is produced.

Still another feature of the present invention is the provision of a klystron in which a standard mass produced mounting member or stem having certain of the main elements of the klystron such as the cathode gun and focus ring rigidly mounted thereon is vacuum sealed within one end of a mass produced metallic bulb such that the electron beam path through the device is transverse to the axis of the bulb and mounting member, there being a plurality of cavity resonators extending into the evacuated bulb from the other end thereof.

Another feature of the present invention is the provision of a klystron of the immediately preceding featured type in which the resonators are mounted on a waveguide flange which is vacuum sealed over the other end of the bulb, the output of at least one of the cavity resonators being coupled to a vacuum sealed output window in the waveguide flange.

Still another feature of the present invention is the provision of a klystron of the immediately preceding type in which the cavity resonators are internally coupled together such as by a coupling loop extending therebetween.

Another feature of the present invention is the provision of a multicavity klystron of the above type in which one of the cavity resonators is coupled to a coaxial cable which extends out from the vacuum envelope of the tube.

These and other features and advantages of the present invention will be more apparent after a perusal of the following specification taken in connection with the accompanying drawings wherein, Fig. 1 is a view partly in longitudinal section of a novel reflex klystron utilizing the structural elements and assembling method of the present invention including the novel magnetic field shield, Fig. 2 is a cross-section view of the reflex klystron of Fig. 1 taken along the section line 2—2 in the direction of the arrows, Fig. 3A is a view in longitudinal section of a cathode assembly structure of a type heretofore employed, Fig. 3B is a view in longitudinal section of the cathode assembly structure utilized in the klystron of Fig. 1 which incorporates a novel method for shielding the electron emissive area from the magnetic field produced by the current in the heater filament, Fig. 4 is a view in longitudinal section of another novel reflex klystron made in accordance with the present invention which employs a structural element for rendering the tube extremely rugged, Fig. 5 is a longitudinal section view of still another reflex klystron which utilizes the broad concept of the present invention and which employs a novel ruggedized structure, Fig. 6 is a longitudinal section view of another reflex klystron which embodies the present invention and which discloses still another type of element mounting structure, Fig. 7 is a cross-sectional view of the reflex klystron of Fig. 6 taken along the section line 7—7 in the direction of the arrows, Fig. 8 is a view partly in longitudinal section of a reflex klystron which utilizes an external cavity in addition to the internal resonator cavity for tuning the reflex klystron, this klystron being made in accordance with the teachings of the present invention, Fig. 9 is another longitudinal section view of a reflex klystron of a similar type shown in Fig. 8 with a modified external cavity resonator, Fig. 9A is a section view of the klystron of Fig. 9 taken along section line 9A—9A in the direction of the arrows, Fig. 10 is a longitudinal view in section of still another klystron which embodies the present invention, this klystron being a two-cavity klystron having an internal feedback coupling whereby the klystron serves as a high frequency oscillator, Fig. 11 is a longitudinal view in section of still another two-cavity klystron made in accordance with the present invention wherein an input coaxial line is coupled to the input or buncher cavity of the klystron, this particular klystron serving as a high frequency amplifier, Fig. 12 is a view in longitudinal section of still another embodiment of the invention which comprises a klystron employing a floating drift tube which is shown insulated from the cavity resonator in this embodiment, Fig. 13 is a cross section view of the multicavity klystron of Fig. 12 taken along section line 13—13, Fig. 14 is a view partly in longitudinal section of another type of internal-external cavity resonator embodying the present invention, and Fig. 15 is a cross-section view of the klystron shown in Fig. 14 taken along section line 15—15.

Figs. 16 and 17 are longitudinal and cross sectional views, respectively, of a thermally tuned reflex klystron which embodies the present invention, and Fig. 18 is a section view of another type of thermal tuning structure which may be utilized in the embodiment of Fig. 16.

Similar elements in the different figures in the drawings bear similar reference numerals.

Referring now to Figs. 1 and 2, there is shown a reflex klystron which includes a base 1 having the conventional metal prongs 2 embedded therein and the centrally positioned socket-aligning member 3 extending therefrom. A hollow cylindrical two-step metallic bulb or body 4 is secured as by crimping into recesses 1' in the base at its larger diameter open end. A glass stem structure 5 is secured within the bulb 4 at the step portion thereof, the annular outer member 6 of the stem structure 5 being vacuum sealed within the bulb as by brazing at surface 4'. The other open end of the bulb 4 has a slight inwardly directed flange 7.

The glass stem structure or mounting member 5 includes the wires 8 extending through and embedded in the vacuum seal glass 9. The lower ends of the wires are soldered within the prongs 2. The upper ends of the wires extend within the bulb 4 and serve to mount certain of the elements of this tube. Secured on the mounting wires 8 are two spaced-apart plates or disks 11 and 12 of an insulating material such as, for example, mica, these disks being fixedly secured on the wires 8 as by eyelets 13. These disks 11 and 12 have centrally positioned, aligned elongated openings 14 therein. Small tabs 15 (see Fig. 2) extend within the openings 14 from the edges thereof. A U-shaped member 16 is mounted between the two mica disks 11 and 12 having integral ears or tabs 17 projecting through conforming apertures in the disks and bent over to secure the member 16 to the disks. A cathode assembly including concave button 18, focusing electrode 19 and filament 21 is fixedly secured on the member 16. A second U-shaped member 23, which is similar in construction to member 16, is secured between the disks 11 and 12 by suitable ears or tabs 24. A reflector electrode 25 is mounted on this U-shaped member 23.

A cavity resonator 26, which in this particular instance is made up of two identical half-sections stamped out of a sheet of metal and brazed together along their common joint, is mounted as by brazing at its open flanged side 27 on the waveguide flange 28. The cavity is mounted in alignment with the vacuum sealed wave permeable output window 29 in the waveguide flange 28. The window 29, in this instance a ceramic disk, is sealed within the central opening in the waveguide flange by means of an annular adapter member 31. The waveguide flange 28 is brazed to the bulb 4 at the flanged edge 7. Spacer rods 22 are fixedly secured in the disk 11 and engage the under side of the flange 28 to hold the disk mounting structure properly spaced from the waveguide flange.

The opposed end walls of the cavity resonator 26 have centrally positioned circular openings therein. Secured in one opening is a hollow cylindrical re-entrant tube member 32 shown as having an accelerator grid 33 and a first resonator grid 34 secured over the open ends. The opening in the other resonator end wall is shown as having a second resonator grid 35 mounted thereover.

In one preferred method of assembly, the waveguide flange 28, bulb 4, window 29, cavity 26 and associated re-entrant tube 32 and grids 33, 34 and 35, are first assembled and secured into a unitary structure. The mounting stem 5 with the disks 11 and 12, cathode assembly and reflector mounted thereon is slipped into the bulb 4, the cavity resonator 26 passing through the two openings 14 in the two mica disks 11 and 12 until the surface 4' of the stem member 6 comes to rest against the step portion of the bulb 4, this joint being then suitably brazed. The spacer rods 22 insure that the reentrant tube and grids are in vertical alignment with the cathode and reflector. The tabs 15 on the two disks 11 and 12 serve to hold the cavity resonator aligned in a plane perpendicular to the axis through the cathode assembly and reflector. The outer sides 36 of the cavity resonator 26 engage the edges of the openings 14 in both disks 11 and 12 and thus prevent any side misalignment of the resonator 26.

When the spacer rods 22 are used, the leads 8 are made flexible so that they will give slightly during alignment by the spacer rods. It is not necessary to use the spacer rods if the leads 8 and supported assembly are properly jigged during assembly.

It can be seen that this klystron is constructed of small, inexpensive elements which lend themselves readily to mass-production. The manner in which these elements are assembled to form a completed klystron also results in a rapidly assembled klystron requiring a much less degree of tolerance than heretofore existing klystrons. However, the elements utilized and the method of assembly produce a strong and practical although inexpensive klystron device.

Referring now to Fig. 3A, there is shown a cathode structure of the type heretofore employed. The electrons in the beam are represented by the solid arrowed lines. In many cases the heater filament 21 is supplied with an alternating current of, for example, 60 cycles, to produce the necessary heat for emitting the electrons from the emissive surface of the cathode button 18. The filament is non-inductively wound in counter-spiral manner to eliminate magnetic fields. Even though non-inductively wound, there exists a small stray A.C. magnetic field which in large part is produced by the end turn in the filament coil, and minor non-symmetry of the filament and its leads. This stray magnetic field enters the electron emissive area in use and causes a modulation of the electron beam, thus producing a disturbance which has been termed F-M noise. The elimination of this F-M noise has been accomplished by the applicants in a novel manner as shown in the cathode assembly of Fig. 3B. The underside of the cathode button 18 has been coated with a thin layer 37 of a good magnetic material which maintains its magnetic properties even at the maximum temperature reached by the cathode assembly during operation of the klystron. The cathode button itself, when made of the conventional material such as, for example, nickel, loses its magnetic permeability at the normal operating temperature of the cathode and will not serve as a shield. In one embodiment of the present invention, a cobalt coating was utilized, the curie point of this cobalt coating being well above the maximum temperature at which the cathode operates. This magnetic coating 37 provides a good flux path for the stray magnetic field produced by the current through the heater filament and thus shields the beam from the magnetic field. In this manner the magnetic field produced by this heater current is substantially prevented from entering into the electron emissive region and the F-M noise is decreased to a negligible amount.

It should be noted that the shield need not be plated onto the back of the button but it may be a sheet of material possessing the necessary high curie point properties which is welded or otherwise attached to the rear of the cathode button. One may also use an alloy such as, for example, nickel and cobalt, for the cathode button itself, the alloy having a high curie point.

The shielding method is useful in other types of cathodes; for example, it is very useful in the folded-heater type of cathode shown in Figs. 10 to 13, inclusive.

Referring now to Fig. 4, there is shown another embodiment of the present invention which is similar to the klystron of Fig. 1 but which includes a hollow cylindrical reinforcing shell 38 having annular grooves 40 adapted to accommodate the outer edge of the disks 11 and 12. This reinforcing shell 38 is securely affixed as by brazing to tabs 39 extending upwardly from the stem structure 5. This shell 38 serves to hold the disks 11 and 12 and associated elements mounted thereon in a rigid, nonvibratory condition.

Referring to Fig. 5, there is shown still another embodiment of the present invention in which two substantially semi-cylindrical metallic shells or members 41 and 42 are mounted in opposed relationship on the leads 8. These two shells 41 and 42 are insulatingly separated from each other by a mica disk 11, which forms a strong tie between the shells, and by gaps 43'. These two shells provide for a very rigid mounting foundation for the tube elements. The reflector 43 is a hollow cylindrical member having a depressed end 44 which serves as the reflector surface, the reflector being secured as by welding on the shell 41. The cathode assembly comprises a hollow cylindrical focusing ring 45 which serves as a mount for the cathode button 46, the cathode assembly being mounted on the shell 42.

There is shown in Figs. 6 and 7 a somewhat modified reflex klystron constructed in accordance with the present invention. A single, thick disk 51 of suitable insulator material such as ceramic has the cathode assembly and the reflector assembly both suitably mounted thereon in a central opening 52. The cathode assembly comprises an annular focusing electrode 53, the cathode button 54 being secured to the focusing electrode 53 by small mounting wires 55. The heater filament 56 is located behind the button and is connected to two of the leads 8. The focusing electrode 53 is fixedly mounted within a cylindrical mounting member 57 which in turn is secured to the ceramic disk 51 by four straps 58 which are riveted to the disk by small rivets 59. The reflector electrode 61 is mounted on a U-shaped bracket 62 which is riveted to the disk 51 by rivets 63. The cavity resonator 26 is secured to the waveguide flange 28 and bulb 4 before final assembly. The mounting stem 5 and associated tube elements is then fitted within the bulb 4, the cavity resonator 26 slipping into alignment in the opening 52 in the disk 51. The ceramic disk 51 may be brazed within the bulb 4 or it may be held by a pair of annular grooves encircling the bulb or by suitable dimples 64 in the bulb. When the grooves or dimples are utilized it is preferable that the upper groove or row of dimples be first formed in the bulb 4 to properly locate the ceramic disk when it is inserted into the bulb and the lower groove or dimples be then formed in the bulb to securely and fixedly hold the ceramic disk 51 in place.

Although this particular embodiment shown in Figs. 6 and 7 has the ceramic disk 51 mounted on the wires 8 by means of eyelets, it should be understood that another very suitable method for mounting would be to braze the wires 8 directly into the ceramic disk.

Referring now to Fig. 8 there is shown another embodiment of the present invention which comprises a reflex klystron having an external tunable cavity resonator 65 coupled to the internal cavity resonator 26, this cavity 65 being formed of a stamped-out metallic bulb. The internal cavity resonator structure and associated cathode and reflector is similar to that shown in the previous figures and will not be further described. The hollow cylindrical external cavity resonator 65 is mounted at its lower end 66 over the bulb 4, and vacuum sealed thereto as by brazing, the cavity 26 being brazed to the end 66 in alignment with the iris opening 67. The external cavity 65 has a vacuum sealed window 68 as of ceramic mounted in the lower portion thereof by means of annular adapter 69. The mounting wave-guide flange 28 is secured on the outer end of the external cavity resonator 65. A window coupling screw 71 and tuning screw 72 extend into the external cavity 65.

There is shown in Figs. 9 and 9A a reflex klystron made in accordance with this invention which is similar to that shown in Fig. 8 with the exception that the external cavity 73 is reduced from a circular cross-section at the window 68 to a substantially rectangular section which, in some instances of use, is preferable to the cylindrical form shown above. This external cavity assembly comprises two sections, the annular window adapter section 70 in which the circular window 68 is vacuum sealed and the rectangular section 73' which includes a circular flanged end 73" adapted to be fixedly mounted within the end of the adapter 70. The cavity resonator 26 is mounted as by brazing on the adapter 70, there being an iris opening 70' centrally positioned in the adapter 70.

There is shown in Fig. 10 another embodiment of the present invention, in this case a multicavity oscillator. The buncher cavity resonator 74 is formed of a hollow annular member which is brazed to the side wall of the catcher cavity resonator 26, the resonator 26 being brazed to the waveguide flange 28. A drift tube member 75 is mounted on the cavity 26 with two resonator grids secured on the ends thereof. The other two resonator grids 76 and 77 are secured on the cavity resonators 74 and 26, respectively. A small coupling loop 78 extends through an opening between the two cavities 74 and 26. A cathode structure including a focusing electrode 79 and electrode button assembly 81 is mounted on the mounting disk 51 by brackets 81' in alignment with the center of the drift tube. The cathode button assembly 81 is a flattened hollow shell having a raised portion which forms the cathode button surface holding the electron emissive coating, a plan view of this type of cathode being shown in Fig. 13. A collector electrode 82 is secured as by brazing to the bulb 4. This klystron serves as an oscillator, the loop 78 providing the feedback between the output or catcher resonator 26 and the input or buncher resonator 74. The heat generated due to the collection of electrons on the collector electrode 82 is dissipated through and around the walls of the bulb 4.

Referring to Fig. 11, there is shown a multicavity klystron which may be utilized as a high frequency amplifier tube. This tube is constructed in much the same manner as the above described multicavity klystron tube with the exception that the leads 8 extend through small eyelets 83 filled with vacuum sealing material such as glass 84, the eyelets being vacuum sealed in disk 85. A coaxial line 86 also extends through the mounting disk 85 and is vacuum sealed therein. This coaxial line extends into the buncher cavity 87, which is mounted on the side of the catcher cavity 88, and serves to introduce the desired signals into the buncher cavity for amplification.

In this embodiment, the bulb 4, waveguide flange 28, cavity resonators 87 and 88 and associated grids, and collector 82 are brazed together in a first subassembly. The disks 85 and 51, cathode assembly and coaxial line are mounted in another subassembly. The two subassemblies are then brought together in accordance with the principles of this invention and brazed into a unitary structure. The base 1 is then crimped to the remainder of the tube structure. The coupling loop 89 on the coaxial line 86 is adapted to slip into a small coupling opening 91 in the lower side of the buncher cavity 87 when the mounting disk assembly is slipped into the bulb 4, the flanged end 92 of the line engaging the wall of the cavity 87.

There is shown in Figs. 12 and 13 a floating drift tube type of klystron which embodies the principles of the present invention. This tube comprises, in addition to the similar elements of the preceding klystron devices such as the disk 51, cathode assembly, and collector 82, a cavity assembly which includes two identical side walls 89 and 91 joined at their flanged edges, this cavity assembly being brazed to the waveguide flange 28. The floating drift tube member comprises a hollow cylindrical tube 92 shown as having resonator grids 93 secured over both ends thereof. The tube 92 is fixedly secured as by brazing within a circular opening in a flat rectangular mounting member 94. This flat mounting member is fixedly secured within the cavity 89—91 by being sandwiched at both ends between the two cavity halves 89 and 91, there being provided an insulating member 95 for insulating the mounting member 94 from the cavity. The tube 92 is shown insulated from the resonator cavity so that potentials different from that on the cavity resonator walls may be applied thereto for modulation, if desired. In applications where no such difference in potential is necessary, the mounting member 94 may be brazed at the cavity resonator joint without any insulation.

In this floating drift tube type of klystron, an external tunable cavity may be employed, if desired, substantially of the same construction as shown in Figs. 8 or 9.

Another type of externally tuned klystron which is somewhat similar to those shown in Figs. 8 and 9 is disclosed in Figs. 14 and 15. In this instance the main body of the klystron is a single long hollow cylindrical bulb 96. The mounting stem 5 assembly is sealed into one end of the bulb. The cavity resonator 26 is brazed to an annular member 97 which in turn is brazed within the bulb 96. The window 68 and annular adapter 69 are vacuum sealed within the bulb 96. Two walls 98 and 99 having semi-circular end flanges 101 and 102, respectively, are secured as by brazing along flanges 103 and 104 within the bulb 96. These walls 98 and 99 serve to reduce the external cavity to a rectangular cross-section if this feature is desired. A tuning screw 105 is threaded into the external cavity through the bulb 96 and the wall 99. The tuning screw may have a cooperating lock nut if desired. If a cylindrical external cavity is desired then the walls 98 and 99 may be eliminated from the tube. Solid semi-cylindrical blocks of material may be utilized in place of the sections 98 and 99 for reducing the external cavity to a rectangular cross-section.

Referring to Figs. 16 and 17 there is shown another embodiment of the present invention; a thermally tuned reflex klystron. The bulb 4, flange 28, vacuum sealed window 31, and cavity body 91 are brazed together into one unit before final assembly, the cavity body 91 also having secured, on one side, a flexible, metallic annular diaphragm member 92 and reentrant tube 93 and, on the opposite side, an annular, slightly conical, thermal tuning member 94 which is of high thermal-expansion material. A U-shaped metal bracket 90 is also brazed to side of the bulb 4 and to the reentrant tube 93. The cavity body 91 and bracket 90 are of a low thermal expansion material. The two cavity resonator grids 93' are shown mounted on the reentrant tube 93 and thermal tuning member 94. Secured on the mounting wires 8 of the stem structure 5 is a circular mica disk 95 on which is secured a metal support bracket 96 utilized to mount the cathode assembly 97. Also mounted on certain of the mounting wires 8 is a U-shaped mica disk 98 utilized to maintain these mounting wires rigid. Secured to three of these wires 8 is a reflector post 99 having braces 101 for maintaining the post rigid. An annular electron gun comprising a focusing member 102, an electron emissive surface 103 and a heater 104 encircles the reflector post 99 and is so adapted as to focus an annular beam of electrons on the thermal tuning member 94. This annular electron gun is suitably mounted on two of the mounting leads 8. An annular adapter member 105 is brazed around the outer edge of the stem 5. This mounting stem 5 and associated tube elements including the cathode, reflector and annular electron gun mounted thereon, is slipped into the lower end of the bulb 4 and, after alignment of the cathode, resonator grids and reflector 99, the adapter 105 is brazed within the bulb 4.

The cavity resonator is constructed in such manner that the initial size establishes the operating frequency for the klystron somewhat higher than the highest frequency in the desired operating frequency band. The electron beam from the cathode assembly 97 is produced and the tube brought into oscillation. A heater current is supplied to the filament 104 but the potential between cathode 103 and member 94 is such that no tuning beam is produced at this time. This reflex klystron may then be initially tuned to a frequency slightly higher than the highest frequency desired by pressing the metal bulb 4 at the point indicated by the arrow 106. The movement at this portion of the bulb 4 is transmitted through the U-shaped bracket 90 to the reentrant tube 93 which moves to the right looking at Fig. 16 to decrease the gap spacing between the resonator grids 93'. This movement is permitted by the flexing of the diaphragm member 92. After this initial tuning, there is no need to change the gap spacing by pushing on the bulb 4. Further decreases in gap spacing for tuning through the desired frequency band may then be accomplished by means of the annular beam directed from the cathode 103 to the thermal member 94. Variations in the beam density resulting from applied changes in potential between cathode 103 and member 94 produce heat changes in the thermal member 94. The member 94 responds to the heat to expand or contract and thus change the resonator gap spacing for tuning this reflex klystron.

There is shown in Fig. 18 another type of electron gun structure which may be utilized in a tube of the type shown in Fig. 16 for thermal tuning. The reflector 107 is shown mounted on a post 108. The electron emissive structure is shown as a coated spherical member 109 that emits an electron beam which is formed into substantially a hollow cone due to the focusing member 110 and the cup-like shielding member 111. Braces 112 support the shield 111 which protects the reflector 107 from electron bombardment.

The type of klystron disclosed in the drawings and described in the above specification is small and compact, is made from rapidly and cheaply produced tube elements and lends itself to mass production assembly. With regard to size, one tube constructed in accordance with the teachings of this invention along the lines of Figs. 1 and 2 is only 1⅞ inches in overall height and only 15/16 inch across at the center of the bulb 4.

The above embodiments serve to illustrate applications of the present invention but it should be understood that many other different embodiments may be employed. Although a hollow cylindrical bulb 4 has been utilized in the above embodiments, it should be understood that bulbs of other suitable shapes may be used of other materials. The mounting member, which in most of the above embodiments was shown as a glass stem assembly, may be of other suitable construction. There are other types of cathodes, reflectors, cavity resonators, etc. which may be employed in constructing tubes of various types which follow the teachings of this invention and, therefore, it is intended that all matter contained in the above description or shown in the accompanying drawings shall be interpreted as illustrative and not in a limiting sense.

What is claimed is:

1. An electron discharge device comprising a hollow evacuated body, the main axis of which extends between first and second sealed ends of the body, a mounting member vacuum sealed within said first end of the body including means extending within the body, tube elements including a cathode assembly mounted on said means with its axis perpendicular to the main axis of said body, the direction of electron emission from the cathode being substantially perpendicular to the main axis of the body, a second hollow body mounted at one of its ends on the second end of the first body, said second body having an aperture in said end thereof, a cavity resonator mounted on said second body over the aperture therein, said cavity resonator extending within said first body and having a beam path therethrough coinciding with the cathode axis, a vacuum seal window secured within the second body transversely thereof, and a waveguide flange fixedly secured over the other end of the second body.

2. An electron discharge device comprising a hollow evacuated body, the main axis of which extends between first and second sealed ends of the body, a mounting member vacuum sealed within said first sealed end of said body including means extending within said body, tube elements including a cathode assembly mounted on said means with its main axis substantially perpendicular to the main axis of said body, an annular, cup-shaped adapter mounted on said body over the second end thereof, said adapter having a centrally positioned aperture therein, a cavity resonator having an output opening therein, said resonator being mounted on said adapter with its opening aligned with the aperture in said adapter, a wave energy permeable window vacuum sealed within said adapter, an external cavity member having a circular end flange, the end flange being mounted in the annular adapter, and a waveguide flange mounted on the other end of said external cavity member.

3. An electron discharge device of the velocity modulation type comprising a hollow evacuated body, the main axis of which extends between first and second sealed ends of the body, a mounting member secured within said first sealed end of said body having means secured thereon extending within said body, said means comprising a pair of mounting plates of insulating material spaced apart in parallelism, the surfaces of the plates extending perpendicular to the main axis of the body, a cathode assembly mounted between said mounting plates, the main axis of said cathode being substantially perpendicular to the main axis of said body, a wave energy permeable member vacuum sealed in said second end of the body, and a cavity resonator secured within said second sealed end of the body and extending within said body from said second end and having a window opening, said cavity resonator extending into the space between said mounting plates and providing a beam path coinciding with the cathode axis, the window opening of the cavity resonator facing in the direction of and aligned with the wave energy permeable member in said second vacuum sealed end of the body.

4. An electron discharge device as claimed in claim 3 wherein said cathode assembly includes a cathode button, filament and focusing electrode.

5. An electron discharge device of the velocity modulation type comprising a hollow evacuated body, the main axis of which extends between first and second sealed ends of the body, a mounting member secured within said first sealed end of said body having means secured thereon extending within said body, tube elements including a cathode assembly mounted on said means extending within the body, the main axis of said cathode being substantially perpendicular to the main axis of said body, a wave permeable window vacuum sealed in said second end of the body, a re-entrant type cavity resonator secured in a cantilever fashion from one of its side walls on said second sealed end of the body and extending within said body from said second end, said cavity resonator having a window opening in said side wall, said cavity resonator providing a beam path through its re-entrant portion coinciding with the cathode axis, the window opening of the cavity resonator facing in the direction of and aligned with the wave permeable window in said second vacuum sealed end of the body and means for accurately positioning said cavity resonator with respect to said mounting member within said body whereby the beam path through said re-entrant portion is accurately aligned with said cathode axis.

6. An electron discharge device as claimed in claim 5 wherein said mounting member includes a plurality of mounting wires vacuum sealed within the one end of said bulb and extending outside the bulb for electrical connections for the tube elements.

7. An electron discharge device as claimed in claim 5 wherein said second end of the body has a waveguide flange vacuum sealed thereto, said wave permeable window being vacuum sealed within said waveguide flange, said cavity resonator being mounted on said waveguide flange with its window opening aligned with the vacuum sealed window in said flange.

8. A reflex klystron comprising a hollow evacuated body, the main axis of which extends between first and second sealed ends of the body, a mounting member secured within said first sealed end of said body having means secured thereon extending within said body, tube elements including a cathode assembly and a reflector electrode mounted on said means extending within the body, the main axis of said cathode and reflector being substantially perpendicular to the main axis of said body, a wave permeable window vacuum sealed in said second end of the body, a re-entrant type cavity resonator secured in a cantilever fashion from one of its side walls on said second sealed end of the body and extending within said body from said second end, said cavity resonator having a window opening in said side wall, said cavity resonator being positioned between said cathode and reflector and providing a beam path through its re-entrant portion coinciding with the cathode and reflector axis, the window opening of the cavity resonator facing in the direction of and aligned with the wave permeable window in said second vacuum sealed end of the body, and means for accurately positioning said cavity resonator with respect to said mounting member within said body whereby the beam path through said re-entrant portion is accurately aligned with said cathode and reflector axis.

9. A tunable reflex klystron comprising a hollow evacuated body, the main axis of which extends between first and second sealed ends of the body, a mounting member secured within said first sealed end of said body having means secured thereon extending within said body, tube elements including a cathode assembly and a reflector electrode mounted on said means extending within the body, the main axis of said cathode and reflector being substantially perpendicular to the main axis of said body, a wave permeable window vacuum sealed in said second end of the body, a re-entrant type cavity resonator secured in a cantilever fashion from one of its side walls on said second sealed end of the body and extending within said body from said second end, said cavity resonator having a window opening in said side wall, said cavity resonator being positioned between said cathode and reflector and providing a beam path through its re-entrant portion coinciding with the cathode and reflector axis, the window opening of the cavity resonator facing in the direction of and aligned with the wave permeable window in said second vacuum sealed end of the body, means for accurately positioning said cavity resonator with respect to said mounting member within said body whereby the beam path through said re-entrant portion is accurately aligned with said cathode and reflector axis, and a hollow cavity resonator secured to said second sealed end of the body over said vacuum sealed window and external of said body having means therein for changing the resonance frequency of said external cavity resonator and thus tuning said reflex klystron.

10. An electron discharge device of the velocity modulation type comprising a hollow evacuated body, the main axis of which extends between first and second sealed ends of the body, a mounting member secured within said first sealed end of said body having means secured thereon extending within said body, tube elements including a cathode assembly mounted on said means extending within the body, the main axis of said cathode being substantially perpendicular to the main axis of said body, a wave permeable window vacuum sealed in said second end of the body, a plurality of re-entrant type cavity resonators secured in a cantilever fashion from said second sealed end of the body and extending within said body from said second end, at least one of said cavity resonators having a window opening in its side wall, said cavity resonators providing a beam path through their re-entrant portions coinciding with the cathode axis, the window opening in said one cavity resonator facing in the direction of and aligned with the wave permeable window in said second vacuum sealed end of the body and means for accurately positioning said cavity resonator with respect to said mounting member within said body whereby the beam path through said re-entrant portions is accurately aligned with said cathode axis.

11. An electron discharge device of the velocity modulation type comprising a hollow evacuated body, the main axis of which extends between first and second sealed ends of the body, a mounting member secured within said first sealed end of said body having means secured thereon extending within said body, tube elements including a cathode assembly mounted on said means extending within the body, the main axis of said cathode being substantially perpendicular to the main axis of said body, said means including at least one mounting plate of insulating material on which said tube elements are mounted, the plane of said plate extending perpendicular to the main axis of said body, a wave permeable window vacuum sealed in said second end of the body, a re-entrant type cavity resonator secured in a cantilever fashion from one of its side walls on said second sealed end of the body and extending within said body from said second end and through an opening in said mounting plate, said cavity resonator having a window opening in said side wall, said cavity resonator providing a beam path through its re-entrant portion coinciding with the cathode axis, the window opening of the cavity resonator facing in the direction of and aligned with the wave permeable window in said second vacuum sealed end of the body, and means on said mounting plate for accurately positioning said cavity resonator with respect to said mounting member within said body whereby the beam path through said re-entrant portion is accurately aligned with said cathode axis.

12. A reflex klystron comprising a hollow evacuated body, the main axis of which extends between first and second sealed ends of the body, a mounting member secured within said first sealed end of said body having means secured thereon extending within said body, tube elements including a cathode assembly and a reflector electrode mounted on said means extending within the body, the main axis of said cathode and reflector being substantially perpendicular to the main axis of said body, said means including at least one mounting plate of insulating material on which said tube elements are mounted, the plane of said plate extending perpendicular to the main axis of said body, a wave permeable window vacuum sealed in said second end of the body, a re-entrant type cavity resonator secured in a cantilever fashion from one of its side walls on said second sealed end of the body and extending within said body from said second end and through an opening in said mounting plate, said cavity resonator having a window opening in said side wall, said cavity resonator being positioned between said cathode and reflector and providing a beam path through its re-entrant portion coinciding with the cathode and reflector axis, the window opening of the cavity resonator facing in the direction of and aligned with the wave permeable window in said second vacuum sealed end of the body, and means on said mounting plate for accurately positioning said cavity resonator with respect to said mounting member within said body whereby the beam path through said re-entrant portion is accurately aligned with said cathode and reflector axis.

References Cited in the file of this patent

UNITED STATES PATENTS

| | | |
|---|---|---|
| Re. 23,479 | Varian | Apr. 8, 1952 |
| 1,814,759 | McCullough | July 14, 1931 |
| 2,138,918 | Haller | Dec. 6, 1938 |
| 2,304,186 | Litton | Dec. 8, 1942 |
| 2,411,538 | Goodchild | Nov. 26, 1946 |
| 2,454,330 | McNall et al. | Nov. 23, 1948 |
| 2,454,970 | Lafferty | Nov. 30, 1948 |
| 2,457,495 | Rochester | Dec. 28, 1948 |
| 2,494,693 | Ekstrand et al. | Jan. 17, 1950 |
| 2,521,545 | Shepherd | Sept. 5, 1950 |
| 2,614,234 | Voge | Oct. 14, 1952 |
| 2,631,258 | Gardner | Mar. 10, 1953 |
| 2,632,863 | Norton | Mar. 24, 1954 |
| 2,777,969 | Svensson | Jan. 15, 1957 |
| 2,792,520 | McArthur | May 14, 1957 |
| 2,816,245 | Coeterier | Dec. 10, 1957 |

FOREIGN PATENTS

| | | |
|---|---|---|
| 114,403 | Australia | Dec. 11, 1941 |